US012734804B2

(12) United States Patent
Taff et al.

(10) Patent No.: US 12,734,804 B2
(45) Date of Patent: Sep. 15, 2026

(54) PRINTHEAD ALIGNMENT

(71) Applicant: Kateeva, Inc., Newark, CA (US)

(72) Inventors: Robert D. Taff, Lenexa, KS (US); Christopher Buchner, Sunnyvale, CA (US)

(73) Assignee: Kateeva, Inc., Newark, CA (US)

( * ) Notice: Subject to any disclaimer, the term of this patent is extended or adjusted under 35 U.S.C. 154(b) by 79 days.

(21) Appl. No.: 18/719,676

(22) PCT Filed: Dec. 15, 2022

(86) PCT No.: PCT/US2022/081647
§ 371 (c)(1),
(2) Date: Jun. 13, 2024

(87) PCT Pub. No.: WO2023/122474
PCT Pub. Date: Jun. 29, 2023

(65) Prior Publication Data

US 2025/0042154 A1 Feb. 6, 2025

Related U.S. Application Data

(60) Provisional application No. 63/265,807, filed on Dec. 21, 2021.

(51) Int. Cl.
*B41J 25/00* (2006.01)
*B41J 2/14* (2006.01)

(52) U.S. Cl.
CPC ........... *B41J 2/1433* (2013.01); *B41J 25/001* (2013.01); *B41J 25/003* (2013.01); *B41J 2202/15* (2013.01); *B41J 2202/20* (2013.01)

(58) Field of Classification Search
CPC ...... B41J 2/1433; B41J 25/001; B41J 25/003; B41J 2202/15; B41J 2202/20
See application file for complete search history.

(56) References Cited

U.S. PATENT DOCUMENTS

2002/0126169 A1 9/2002 Wyngaert et al.
2003/0128254 A1 7/2003 Ison et al.
(Continued)

FOREIGN PATENT DOCUMENTS

JP 2001-113679 A 4/2001
JP 2004-136555 A 5/2004
(Continued)

OTHER PUBLICATIONS

International Search Report and Written Opinion, dated Mar. 31, 2023, mailed in International Patent Application No. PCT/US2022/081647, filed on Dec. 15, 2022.
(Continued)

*Primary Examiner* — Yaovi M Ameh
(74) *Attorney, Agent, or Firm* — Hauptman Ham, LLP

(57) ABSTRACT

A printhead assembly for an inkjet printer is described herein. The printhead assembly includes a printhead having a plurality of nozzles, a nozzle plate attached to the printhead, and a base plate attached to the nozzle plate by at least three fasteners that provide independent positioning of the nozzle plate with respect to the base plate in three independent dimensions. The printhead assembly has fluid connections between the printheads and a fluid manifold that has alignment features. The printhead assembly also has a tile structure that couples to the base plate, the tile structure having a first section flexibly coupled to a second section.

20 Claims, 4 Drawing Sheets

(56) References Cited

U.S. PATENT DOCUMENTS

| | | | | |
|---|---|---|---|---|
| 2007/0070106 | A1* | 3/2007 | Yasuda | B41J 2/14209 347/13 |
| 2015/0165799 | A1 | 6/2015 | Lutz | |
| 2017/0057262 | A1 | 3/2017 | Takada | |
| 2017/0087904 | A1* | 3/2017 | Ferrari | B41J 25/34 |
| 2019/0210385 | A1 | 7/2019 | Izawa et al. | |

FOREIGN PATENT DOCUMENTS

| | | | | |
|---|---|---|---|---|
| JP | 2008062583 | A * | 3/2008 | B41J 2/01 |
| WO | WO-2013015093 | A1 * | 1/2013 | H05K 3/28 |

OTHER PUBLICATIONS

Search report issued Nov. 18, 2025, in European Application No. 22912584.4.

* cited by examiner

PRINTHEAD ALIGNMENT

CROSS REFERENCE TO RELATED APPLICATIONS

This application is a U.S. National Stage under 35 U.S.C. § 371 of International Application No. PCT/US2022/081647, filed on Dec. 15, 2022, which claims benefit of U.S. Provisional Patent Application No. 63/265,807, filed on Dec. 21, 2021, which are entirely incorporated herein by reference.

BACKGROUND

Industrial inkjet printers are used to apply materials to large substrates to form devices of all kinds. The substrates can be rigid or flexible, thick or thin, and can be made of an array of materials. The most common types of substrates used in this way are substrates made of various types of glass, which are processed to make electronic displays such as televisions and displays for smart phones.

An inkjet printer uses a printhead with nozzles that dispense a print material for deposition onto a substrate. Today's industrial inkjet printers deposit very small droplets of print material with extremely high accuracy to form very small, or very thin, precisely located structures on the substrate. To increase production speed, multiple printheads are commonly used to perform a single print job. Due to the extreme precision of modern inkjet printing, precision alignment of the printheads is helpful to make sure printed droplets land in desired locations. As the size of printed droplets declines toward 10 μm, the need for printhead alignment increases.

Sometimes, a printhead of an industrial scale inkjet printer needs to be swapped. Today's printheads commonly come in multiples, with several printheads to a cartridge, and an assembly of printheads used for a particular printer might need multiple cartridges of printheads. To minimize printer downtime while printheads and cartridges are swapped, quick removal and insertion of printhead cartridges is useful while making secure connections with ink supply and electrical components. It is also helpful if the cartridges can all be aligned with each other.

Finally, operation of an inkjet printer typically results in printer components changing temperature. For printheads and cartridges, the temperature changes can change alignments and positions of nozzles. Such changes often require recalibration of the printer based on the new positions of the nozzles, since the nozzles can change position by several microns depending on the operating temperature ranges. For example, a printhead can be installed and aligned within one print cartridge, and several cartridges put together to form a printhead assembly, all at room temperature. When the printhead assembly rises in temperature during production, the alignment of all the printheads and nozzles can change. Time-consuming calibration operations are needed to detect and react to these changes, slowing down production. To the extent these changes can be managed and minimized, production speed can be increased.

There is an ongoing need for methods and apparatus for achieving, maintaining, and managing extremely precise alignment of printheads for industrial scale inkjet printers.

SUMMARY

Embodiments described herein provide a printhead assembly for an inkjet printer, the printhead assembly comprising a printhead having a plurality of nozzles; a nozzle plate attached to the printhead; and a base plate attached to the nozzle plate by at least three fasteners that provide independent positioning of the nozzle plate with respect to the base plate in three independent dimensions.

Other embodiments described herein provide a printhead assembly for an inkjet printer, the printhead assembly comprising a support plate; a supply plate comprising a plurality of alignment features; a plurality of print tiles disposed between the support plate and the supply plate, each print tile comprising a plurality of printheads, each printhead comprising a plurality of nozzles; a nozzle plate attached to each printhead; a base plate attached to the nozzle plate by at least three fasteners that provide independent positioning of the nozzle plate with respect to the base plate in three independent dimensions; and a fluid manifold comprising at least one alignment feature that matches one of the alignment features of the supply plate.

DETAILED DESCRIPTION

Figure 1A:
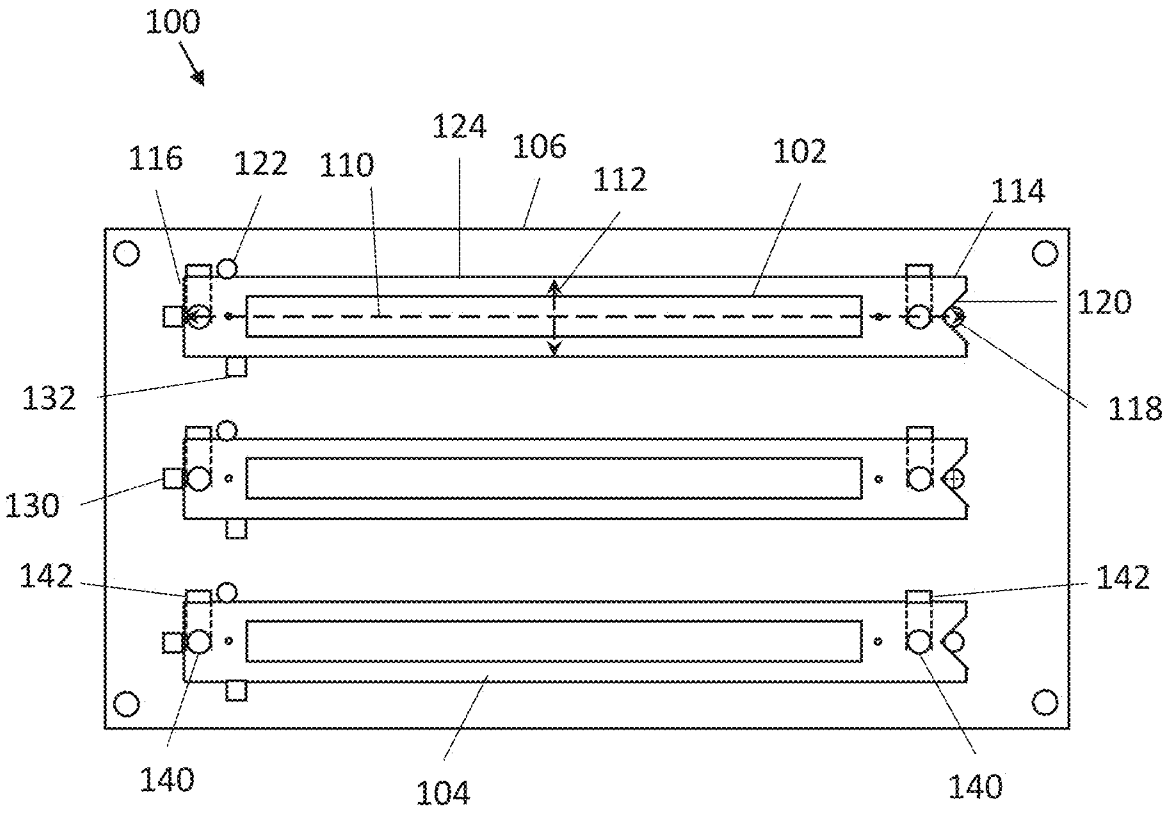
FIG. 1A is a plan view of a printhead cluster according to one embodiment.

FIG. 1A is a plan view of a printhead cluster 100 according to one embodiment. The printhead cluster 100 has a plurality of printheads 102, in this case three printheads 102, each printhead having a plurality of print nozzles for dispensing a print material. The nozzles are not shown here for simplicity. Each of the printheads 102 is attached to a nozzle plate 104. Each nozzle plate 104 is attached to a base plate 106 that serves to group the nozzle plates 104 and printheads 102 into the cluster 100.

Each nozzle plate 104 is attached to the base plate by three fasteners that provide independent positioning of the nozzle plate with respect to the base plate in three independent dimensions. Each nozzle plate 104 has a long dimension 110, a short dimension 112, a first end 114, and a second end 116 located opposite from the first end 114 along the long dimension 110. A first fastener 118 is located at the first end 114, on a central axis of the nozzle plate in the direction of the long dimension 110, and is operable to position the nozzle plate 104 along the long dimension 110 thereof. The first end 114 has a notch 120 formed therein that is symmetrical with respect to the long dimension 110. In this case, the notch 120 has two straight sides that merge to a point located on the central axis of the nozzle plate 104 that extends along the long dimension 110. The first fastener 118 provides a positioning force at the first end 114 by providing equal forces on the two sides of the notch 120. The forces cancel in the direction of the short dimension and add in the direction of the long dimension to provide the capability to position the nozzle plate 104 in the direction of the long dimension 110 by operating the first fastener 118. The base plate has a low thermal expansion coefficient to provide dimensional stability for maintaining positional relationship of the printheads and other components of the printhead cluster 100. In one example, the base plate has a thermal expansion coefficient that is less than about $20\times10^{-6}$/K.

Figure 1B:
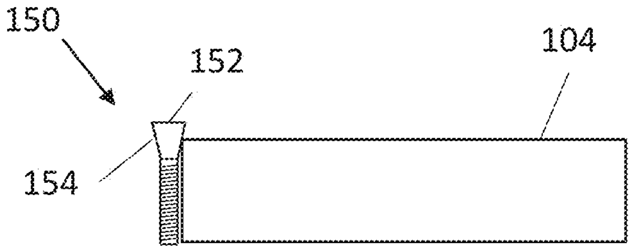
FIG. 1B is an elevation view of a portion of the printhead cluster of FIG. 1A.

FIG. 1B is a schematic elevation view of a portion of the printhead cluster 100. A portion of the nozzle plate 104 is shown, with an example of a fastener 150 that can be used to position the nozzle plate 104, as described above. The fastener 150 is a conical screw that has a conical head 152 with a sloped edge 154. The fastener 150 is positioned such that the conical head 152 impinges on the nozzle plate 104. As the conical screw 150 is operated, the impingement point of the nozzle plate 104 on the conical head 152 changes. As the conical screw 150 is advanced, the impingement point moves to a larger radius location of the conical head 152, resulting in a force that urges the nozzle plate 104 away from the conical screw 150. As the conical screw 150 is retracted, the impingement point of the conical head 152 on the nozzle plate 104 moves to a location of smaller radius, reducing the force applied to the nozzle plate 104 by the conical screw 150. Opposing forces on the nozzle plate 104 then urge the nozzle plate 104 toward the conical screw 150 in accordance with the changing force balance on the nozzle plate 104. In this way, a conical screw can be used as a fastener that can position the nozzle plate in the direction of the long dimension 110.

Referring again to FIG. 1A, the notch 120 can have any shape that can be symmetrical with respect to the long dimension 110. The shape can be polygonal, circular, or irregular.

A second fastener 122 is located at the second end 116 and is operable to position the nozzle plate 104 in the direction of the short dimension 112 thereof. The second fastener 122 is located along a side 124 of the nozzle plate 104 near the second end 116. In this case, because the second fastener 122 is located along the side 124 of the nozzle plate 104 near the second end 116, the second fastener 122 is operable to rotate the nozzle plate 104 about an axis perpendicular to the nozzle plate 104. That is to say, operating the second fastener 122 can rotate the nozzle plate 104 about an axis perpendicular to a plane defined by the long dimension 110 and the short dimension 112, which is a plane substantially parallel to the base plate 106, of the nozzle plate 104.

As the second fastener 122 is operated, the second end 116 is moved in the direction of the short dimension 112 while the first end 114 rotates about the first fastener 118. If the first fastener 118 is not operated simultaneously, the first fastener 118 maintains the position of the nozzle plate 104 with respect to the long dimension 110, and maintains the location of the first end 114, while the second fastener 122 changes the location of the second end 116, resulting in rotation of the nozzle plate 104 about the fixed location of the first fastener 118. The distance the second fastener 122 moves the nozzle plate 104 is short, so the second fastener 122 effectively moves the nozzle plate 104 in a quasi-linear fashion substantially parallel (i.e. differentially non-parallel) to the short dimension 112. The second fastener 122 is also operable to align the nozzle plate 104 with any desired feature or direction, but most notably the second fastener 122 of each nozzle plate 104 can be operated to align the nozzle plates 104, one to another, so that all the nozzle plates 104 of the printhead cluster 100 can be aligned. By operating the first fasteners 118 of each nozzle plate 104, all the nozzle plates 104 of the printhead cluster 100 can be aligned in two independent dimensions defining a plane substantially parallel to the plane of the base plate 106.

An opposing member 130 can be provided to provide restorative force in the direction of the long dimension 110. The opposing member 130 is located at the second end 116 of the nozzle plate 104, impinging on the second end 116. The opposing member 130 is a resilient member configured to apply force to the nozzle plate in a direction substantially opposite to the direction of the force applied by the first fastener 118. As the first fastener 118 is operated to force the nozzle plate 104 toward the opposing member 130, away from the first fastener 118, the opposing member 130 yields to allow the nozzle plate t102 to move away from the first fastener 118. The opposing member 130 stores restorative potential energy as the nozzle plate 104 moves away from the first fastener 118. As the first fastener 118 is operated to move the nozzle plate 104 toward the first fastener 118, the restorative potential energy stored in the opposing member 130 is released to move the nozzle plate 104 toward the first fastener 118.

In some cases, the opposing member 130 can be a first opposing member, and the printhead cluster 100 can have a second opposing member 132 located opposite from the second fastener 120 to provide a similar restorative force that moves the nozzle plate 104 toward the second fastener 120 when the second fastener 120 is operated to allow the nozzle plate 104 to rotate toward the second fastener 120. The first and second opposing members 130 and 132 can be spring members such as leaf springs or coil springs, or other resilient members such as homogeneous compressible members, for example, rubber stops.

It should be noted that the opposing members 130 and 132 are useful in managing the effects of thermal expansion during temperature cycles. As the printhead cluster 100 changes temperature, thermal expansion of the components of the printhead cluster 100 causes a change in dimensions and relative positions of the components. Because the components are nearly identical in composition and close in relative location, like components (for example all the nozzle plates 104) will have almost identical thermal response. The nozzle plates 104, for example, will grow in dimension as temperature rises. The various fasteners impinging the nozzle plates 104 will remain in place, so the thermal expansion will increase force on the opposing members 130 and 132, which will yield. As temperature then falls in a cycle, the opposing members 130 and 132 will relax with the shrinking dimension of the nozzle plates 104, effectively maintaining all the nozzle plates 104 in alignment through the temperature cycle.

A third fastener 140 can be provided to provide adjustment of the nozzle plate 104 in a third direction independent from the direction of the long dimension 110 and the short dimension 112. In this case, one or more spacers 142 is used with the third fastener 140 of each nozzle plate 104 to adjust the position of the nozzle plate 104 in the third direction. In this case, two fasteners 140 are used to position the nozzle plate 104 in the third direction, one located the first end 110 and another located at the second end 112. The two fasteners 140 can be operated independently, using respective spacers 142, to additionally allow leveling of the nozzle plate 104, and the printhead 102 attached thereto. The spacers 142 are disposed between the nozzle plate 104 and the base plate 106, and generally under the force area of the third fastener 140, to position the nozzle plate 104, in the vicinity of the third fastener 140, at a desired location along the third direction. The spacers 142 can have any desired thickness to allow for parametric positioning of the nozzle plate 104 along the third direction. In one example, each spacer 142 has a thickness of 25 μm, but other different thicknesses can be used. The spacers 142 generally protrude outward between the nozzle plate 104 and the base plate 106 to facilitate manipulation of the spacers 142. It should be noted that more than one spacer 142 can be used at a single location, and no spacers 142 can be used at some locations, depending on what adjustment is needed to the nozzle plate 104 position and angle with respect to the third direction.

The nozzle plates 104, with printheads 102 attached, can be aligned according to the three directions in any order. In one process, the nozzle plate 104 is loosely attached to the base plate 106. A first nozzle plate 104 of the printhead cluster 100 is set at a fixed position with respect to the long dimension 110 using a fixed-position fastener 144 at the notch 120. The other nozzle plates 104, with printheads 102 attached, are aligned with the first nozzle plate 104, at the respective first ends 114 thereof using the first fasteners 118. The second fasteners 122 of all the nozzle plates 104 are operated to align all the nozzle plates 104, and may be used to align all the nozzle plates 104 with a standard alignment, such as an edge of the base plate 106. The third fasteners 140 are then operated, with spacers 142, to align and level the nozzle plates 104 with respect to the third direction. The base plate 106 has four recesses 146 for receiving posts of a tile structure to be described below. The recesses 146 allow the printhead cluster 100 to be integrated into a print tile that supplies print fluid to the printhead cluster 100 and controls operation of the printhead cluster 100.

Figure 2A:
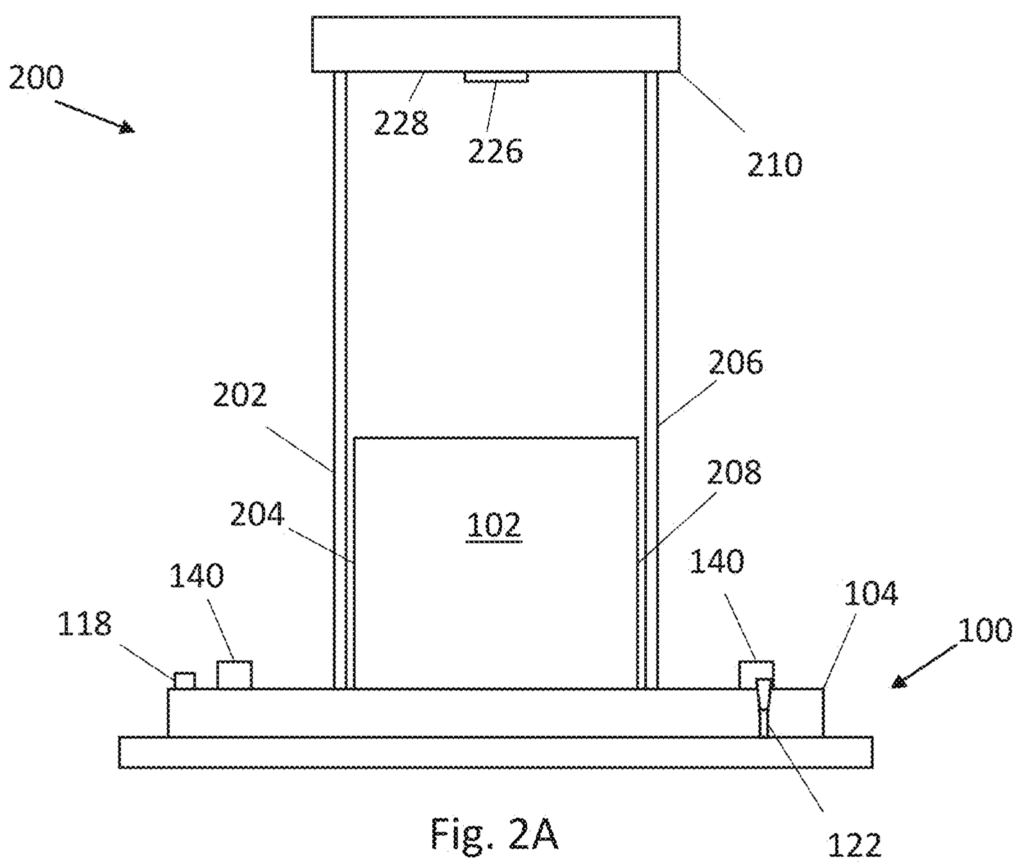
FIG. 2A is a schematic side elevation view of a tile component for use with an industrial scale inkjet printer according to one embodiment.

Print fluid conduits are attached to the printhead cluster 100 to supply print fluid to the printheads 102. FIG. 2A is a schematic side elevation view of a tile component 200 for use with an industrial scale inkjet printer, according to one embodiment. The tile component 200 comprises the printhead cluster 100, seen here in elevation view, with one printhead 102, nozzle plate 104, and set of first, second, and third fasteners 118, 122, and 140 visible. A supply conduit 202 is attached to the nozzle plate 104 adjacent to a first side 204 of the printheads 102 and a return conduit 206 is attached to the nozzle plate 104 adjacent to a second side 208 of the printheads 102. The supply conduit 202 brings print fluid to the printheads 102, and the return conduit 206 returns print fluid from the printheads 102. The tile component 200 is therefore a fluid component that can be used as part of a print tile (not shown in FIG. 2A) for an inkjet printer. The supply and return conduits 202 and 206 can be swapped in position relative to what is shown in FIG. 2A. That is, the supply conduit 202 could be attached adjacent to the second side 208 and the return conduit 206 could be attached adjacent to the first side 204.

Figure 2B:
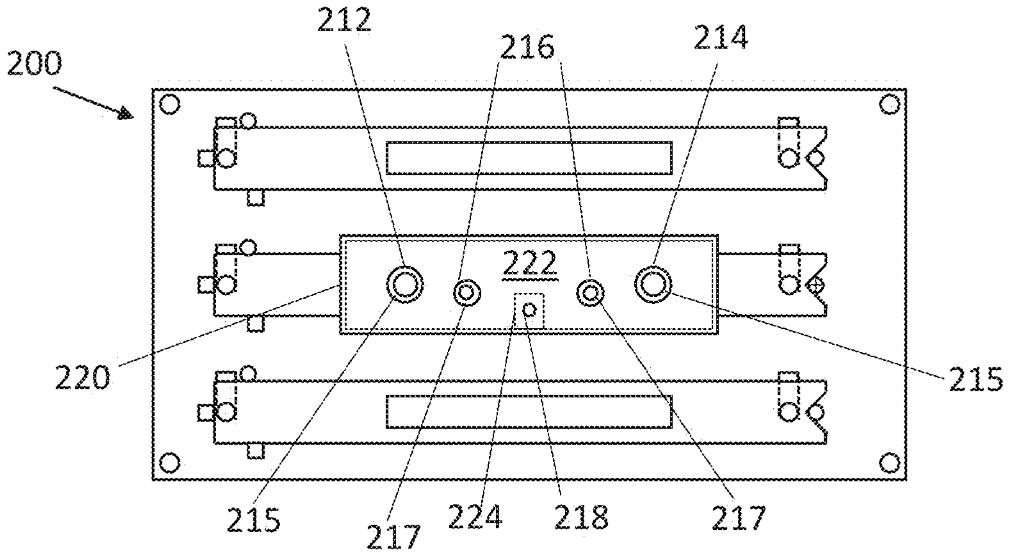
FIG. 2B is a schematic top view of the tile component of FIG. 2A.

The supply conduit 202 and the return conduit 206 are also attached to a fluid manifold 210, which is used to fluidly connect the tile component 200 with a print supply system (not shown). FIG. 2B is a schematic top view of the tile component 200. The fluid manifold 210 has a fluid supply port 212 and a fluid return port 214 at positions to engage with the supply conduit 202 and the return conduit 206 (FIG. 2A). The fluid supply port 212 and the fluid return port 214 each have a seal face 215 that seals when respective fluid nozzles of the print supply system are inserted. Each fluid nozzle of the print supply system has a shoulder that contacts the seal face 215 with seal pressure, when the fluid connection with the fluid supply port 212 and the fluid return port 214 is made, to seal the connection between the fluid ports 212 and 214 and the print supply system.

The fluid manifold 210 has two alignment features 216 that aid installation of a print tile that has the tile component 200 as a member. The print tile is described further below. The alignment features 216 are located between the fluid supply port 212 and the fluid return port 214, and in this case are positioned slightly displaced from a line connecting the centers of the fluid supply port 212 and the fluid return port 214. The alignment features 216 can be at any convenient location of the fluid manifold 210. The alignment features 216 can be protrusions or recesses. In this case, the alignment features 216 are recesses for receiving alignment protrusions to align the fluid manifold 210 with fluid supply components of the print supply system (not shown in FIG. 2B). Each alignment feature 216 has a sloped entry 217, so that as the print tile having the tile component 200 with the alignment features 216 is inserted and engaged with the print supply system, alignment protrusions for aligning with the print supply system protrude into the alignment features 216 to aid in aligning the print tile during installation, as will be further described below.

The fluid manifold 210 has an engagement feature 218 for securing a print tile having the tile component 200 to the print supply system. In this case, the engagement feature 218 is a threaded recess for receiving a screw that can be operated to secure the engagement of the print tile with the print supply system. The fluid manifold 210 has an outer wall 220 that defines an interior surface 222 of the fluid manifold 210. The outer wall 220 is raised above the interior surface 222 to provide fluid containment when the tile component 200 is disengaged from the print supply system, in the event some fluid escapes containment with in the print supply system or the supply and return conduits 202 and 206 during removal of the print tile. The engagement feature 218 is provided in a platform 224 that has an elevation substantially equal to the elevation of the outer wall 220 to prevent fluid intrusion into the engagement feature 218. Fluid intrusion into the engagement feature 218 is undesirable in this case because the fluid manifold 210 uses a sensor to detect engagement of the screw with the engagement feature 218 for secure installation of the print tile. The platform 224 could have an elevation higher than the elevation of the outer wall 220, and in some cases could have an elevation slightly lower than the elevation of the outer wall 220. If the elevation of the platform 224 is too low, there is a risk of print fluid intruding into the engagement feature 218 when the print tile is disengaged from the print supply system.

Referring again to FIG. 2A, an optical sensor 226 is attached to an underside 228 of the fluid manifold 210 to sense engagement of the screw with the engagement feature 218. The sensor 226 may be attached directly to the fluid manifold 210 or may be attached using an intermediate member, such as a sheet metal (not shown). At full engagement, the screw extends into the optical sensor 226, obscuring an optical path of a light source within the optical sensor. A light detector within the optical sensor senses the presence or absence of light from the light source and outputs a signal accordingly. When light is present the light detector signals that the screw has not been fully engaged. When light is not present the light detector signals that the screw has been fully engaged. In this way, users can receive convenient confirmation that a print tile has been fully engaged with the print supply system.

Other types of sensors can be used to detect engagement. For example, an optical sensor can be located within the fluid manifold 210, rather than attached to the underside 228. Also, an electrical conductivity sensor can be used to detect contact between the screw and the engagement feature, so long as both have electrically conductive elements.

Figure 3A:
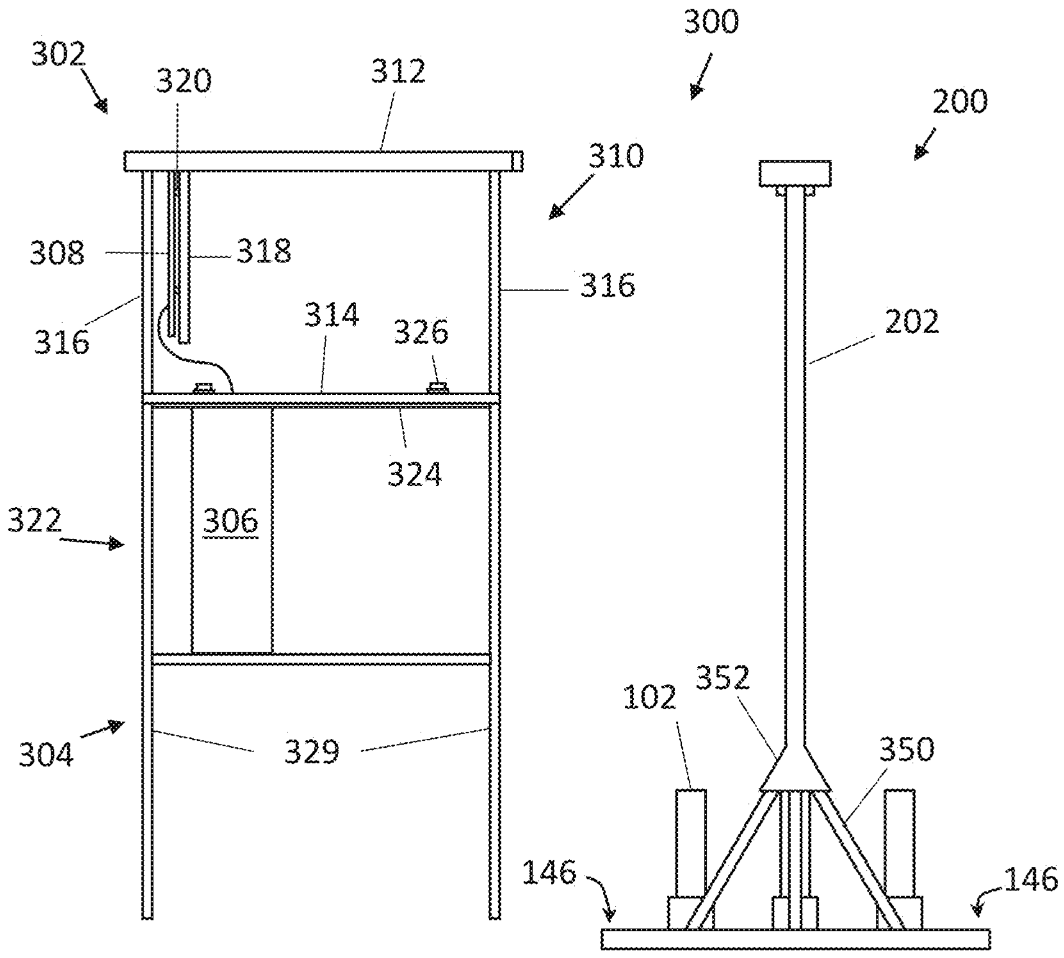
FIG. 3A is a schematic side elevation view of a partially disassembled print tile according to one embodiment.

The tile component 200 is mated with an electrical component to form a print tile. FIG. 3A is a schematic side elevation view of a partially disassembled print tile 300, according to one embodiment. The tile component 200 is shown on the right. The supply conduit 202 is visible here, and the return conduit 206 is obscured in this view. The supply conduit 202 fluidly couples to each printhead 102 through a supply tube 350 for each printhead 102. The supply tubes 350 couple to the supply conduit 202 through a supply tube manifold 352. Similar return tubes and return tube manifold couple the return conduit to the printheads 102 on the opposite side of each printhead 102.

An electrical component 302, shown on the left, is mated with the tile component 200 to form the print tile 300. The electrical component 302 comprises a tile structure 304 that supports a control box 306 and an interface circuit 308. The interface circuit 308 is implemented, in this case, as a circuit board. A wiring electrically connects the interface circuit 308 to the control box 306. The control box 306 contains circuitry to control operation of the printheads 102. When the electrical component 302 is mated with the tile component 200, a wiring is used to connect the control box 306 to the printheads 102.

The tile structure 304 has a first section 310 that supports the interface circuit 308 and provides alignment support to the interface circuit 308 and fluid manifold 210 to facilitate quick and easy connection of the print tile 300 with the print supply system, as illustrated further below. The first section 310 has a first plate 312 and a second plate 314 connected by four upper posts 316 (two are visible in FIG. 3A). The first plate 312 and second plate 314 are substantially parallel and the four upper posts 316 are substantially parallel, one to the others, and perpendicular to the first plate 312 and the second plate 314. The interface circuit 308 is supported by an interface support plate 318 that extends from the first plate 312, in a direction substantially perpendicular to the first plate 312, into the interior of the first section 310. The interface circuit 308 is attached to the interface support plate 318 by spacer mounts 320 that precisely position the interface circuit 308 with respect to the interface support plate 318 to facilitate easy electrical connection with the print supply system.

The second plate 314 of the first section 310 is attached to a second section 322 of the tile structure 304, which has a mounting plate 324 for attachment to the second plate 314. The second plate 314 and the mounting plate 324 are fastened together using flexible fasteners 326 that have flexibility to allow the first section 310 to shift with respect to the second section 322. The flexible fasteners 326 are resilient such that the first section 310 and second section 322 can shift slightly to facilitate easy connection with the print supply system, but the first section 310 and second section 322 remain securely fastened together. In one embodiment, the flexible fasteners 326 are spring shoulder screws, but any flexible fastener can be used.

Figure 3B:
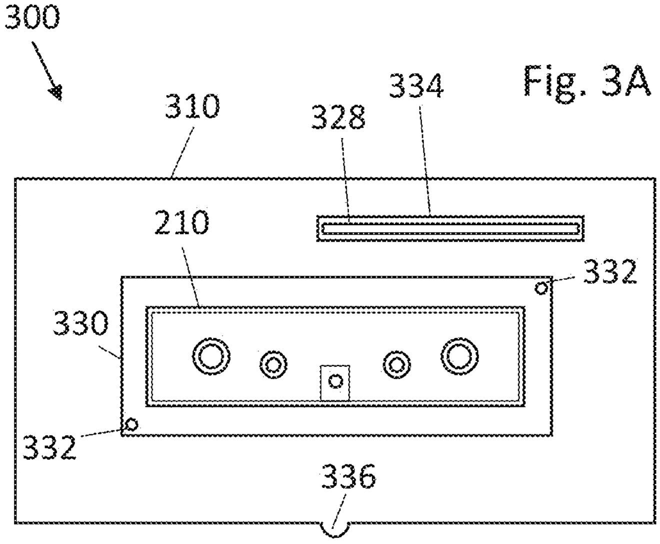
FIG. 3B is a top view of the assembled print tile of FIG. 3A.
Figure 3C:
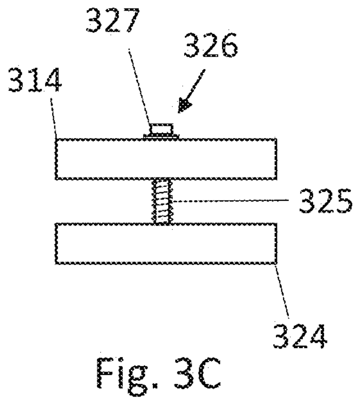
FIG. 3C is a detail view of a portion of the print tile of FIGS. 3A and 3B according to one embodiment.

FIG. 3C is a detail view of a portion of the electrical component 302 showing how the first section 310 is attached to the second section 322, according to one embodiment. The flexible fastener 326 is a spring shoulder screw with a spring 325 disposed between the mounting plate 324 and the second plate 314 under compression imposed by a screw 327. In this way, the first section 310 can float resiliently on the springs 325 while being attached to the second section 322. In other embodiments, the springs 325 can be in tension with the screws 327 holding the plates 314 and 324 apart. Other flexible fasteners can be used.

Referring again to FIG. 3A, the second section 322 has four lower posts 329 extending from the mounting plate 324 to define a perimeter of the second section 322, which in this case is substantially the same as a perimeter of the first section 310 defined by the upper posts 316. The lower posts 329 extend into the recesses 146 (FIG. 1A) of the base plate 106 of the printhead cluster 100 to integrate the electrical component 302 with the tile component 200, thus forming the print tile 300, which can be manipulated as a unit.

The second section 322 also has a control box support plate 312 that attaches to the four lower posts 324. The control box support plate 312 supports the control box 306 and provides rigidity to the second section 322, and to the print tile 300 when the electrical component 302 is mated with the tile component 200.

FIG. 3B is a top view of the assembled tile 300. The first plate 310 is shown with the fluid manifold 210 and connection edge 328 of the interface circuit 308 in position for connection with the print supply system. A window 330 is attached to the first plate 310 by fasteners 332 to provide lateral support and positioning for the fluid manifold 210 when the tile 300 is assembled. The first plate 310 also has an opening 334 for the connection edge 328 to protrude into, optionally through, to make connection with the print supply system. The opening 334 has a space tolerance around the connection edge 328 to allow the connection edge 328 to engage with a connector of the print supply system.

The first plate 312 has an orientation feature 336 to ensure installation of the print tile 300 in the proper orientation. The print tile 300 is installed in a printhead assembly (not shown here) that supports the print tile 300, positions the print tile 300 for printing during operation, and includes the print supply system with which the print tile 300 engages. The printhead assembly has a matching orientation feature that ensures the print tile 300 is installed properly. Here, the orientation feature 336 is a lateral protrusion from an edge of the first plate 312. In this case, the orientation feature 336 protrudes from a long edge of the first plate 312, which is generally rectangular. It should be noted that the first plate 312 can have any convenient shape, and the orientation feature 336 can be located at any convenient location on the first plate 312. Here, the orientation feature 336 has a semi-circular shape, but the orientation feature 336 could have any convenient shape, and instead of a protrusion a recess can be used as an orientation feature. Additionally, any number of orientation features can be used. Here, one orientation feature 336 is shown.

Figure 4:
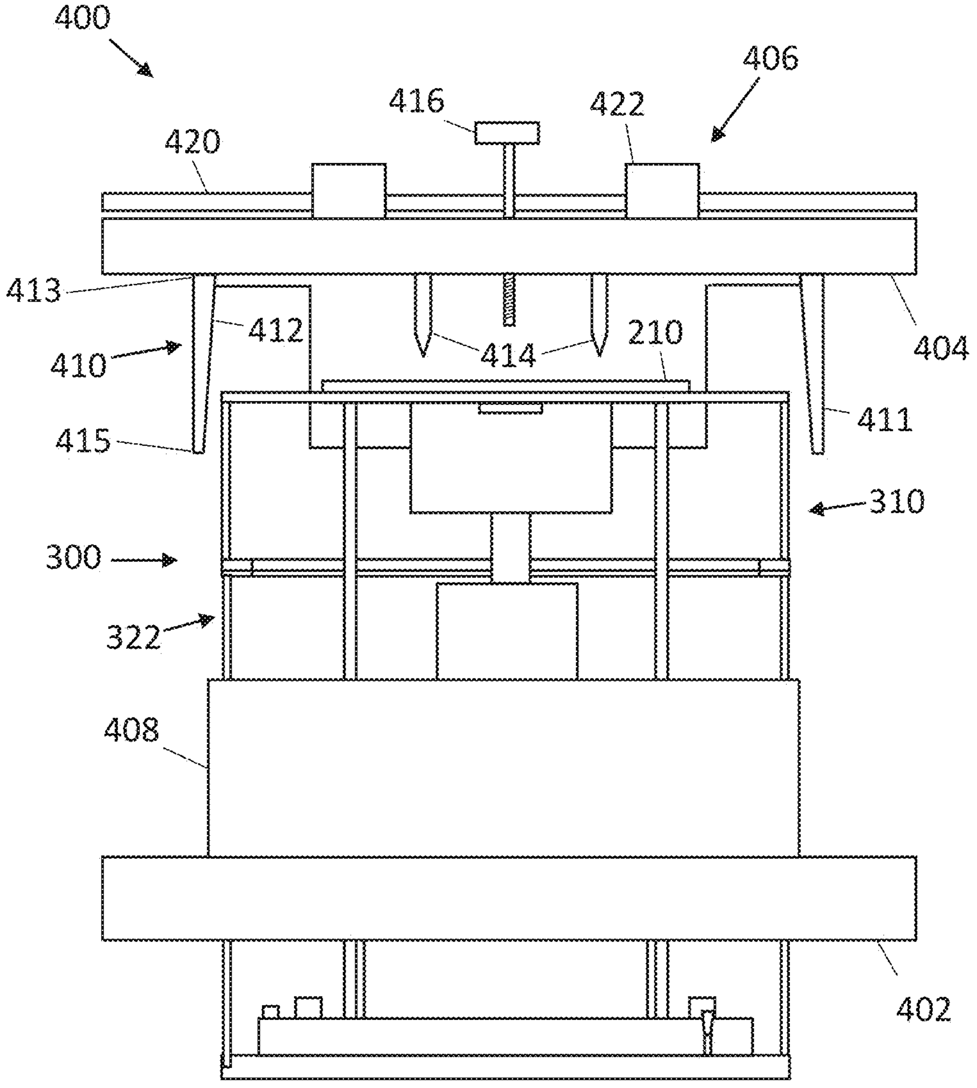
FIG. 4 is a schematic elevation view of a printhead assembly in a partially assembled state, with a partially-inserted print tile

FIG. 4 is a schematic elevation view of a printhead assembly 400 in a partially assembled state, with a partially-inserted print tile. The printhead assembly 400 has a support plate 402 and a supply plate 404. A print supply system 406 is disposed on a first side of the supply plate 404, and connects to the print tile 300 through the supply plate 404. The support plate 402 supports an inserted and connected print tile 300. A plurality of print tiles 300 are inserted to provision the printhead assembly 400.

The print tile 300 is inserted through the support plate 402 and is advanced toward the supply plate 404 until connection is made with the print supply system 406. Guides are used to guide insertion of the print tile 300 through the support plate 402 to the supply plate 404. A first guide 408 is attached to the support plate 402, at a side of the support plate 402 facing the supply plate 404 and extending toward the supply plate 404. Here the first guide 408 is a plate-like structure, but in other cases the first guide 408 could be a pair of rails, one rail to guide each side of the print tile 300. Typically, at least two first guides 408 are used, on opposite sides of the print tile 300 (in this view, only one first guide 408 is visible), and in some cases four first guides 408 can be used, one for each side of the rectangular print tile 300. In general, the first guide 408 is shaped to match the shape of the print tile 300. Here, the print tile 300 is rectangular so the first guide 408 is shaped like a plate to conform to a side of the rectangular print tile 300. In other cases, the print tile 300 could have a different shape. Where the print tile 300 has a generally polyhedral shape, the first guide 408 can have a plate shape to guide along a side of the print tile 300, or the first guide 408 can be rail-like to guide along edges of the print tile 300. Where the print tile 300 has a curved side, the first guide 408 can be curved to match. It should be noted that the first guide 408 can be a plurality of individual plates or a single box-like structure that surrounds the insertion path of the print tile 300. The first guide 408 can also be a partially discontinuous plate-like structure, for example two guide rails connected by one or more bars or rods. The first guide 408 could also be a partially discontinuous box-like structure, for example four guide rails extending from the support plate 402 toward the supply plate 404, with the guide rails connected in a rectangular shape by bars or rods. The first guide 408 generally maintains a straight orientation of the print tile 300 as the print tile 300 is inserted through the support plate 402 toward the supply plate 404.

A second guide 410 is attached to the supply plate 404, at a side of the supply plate 404 facing the support plate 402 and extending toward the support plate 402. The second guide 410 has a plurality of plate-like structures 411, each with a sloped profile, to guide the print tile 300 into registration with the various connection features of the supply plate 404 and the print supply system 406. The second guide 410, in this case, is a single member that attaches to the side of the supply plate 404 facing the support plate 402, with the plate-like structures 411 extending toward the support plate 402. Three of the plate-like structures 411 of the second guide 410 are visible in FIG. 4B. The second guide 410 has four plate-like structures 411, but in the view of FIG. 4B, the nearest plate-like structure 411 has been omitted from the view to show details of the print tile 300 in relation to the supply plate 404 and print supply system 406.

Each of the plate-like structures 411 has an inner surface 412 that faces inward toward the print tile 300. For each plate-like structure 411, the inner surface 412 slopes away from the print tile 300 as the inner surface 412 extends away from the supply plate 404. In other words, each plate-like structure 411 has a wide end 413 and a narrow end 415, the wide end 413 adjacent to the supply plate 404 and the narrow end 415 opposite from the wide end 413. As the print tile 300 is advanced toward the supply plate 404, the sloped inner surfaces 412 of the plate-like structures 411 narrow the positional freedom of the print tile 300 toward the wide ends 413 of the plate-like structures 411 to guide the print tile 300 into position where the fluid manifold 210 and the connection edge 328 (FIG. 3B) of the interface circuit 308 can connect with fluid and electrical features of the print supply system 406.

The supply plate 404 has two alignment features 414 that engage with the alignment features 216 (FIG. 2B). The alignment protrusion 414, in this case protrusions, are pointed to ensure engagement with the alignment features 216 (FIG. 2B) of the fluid manifold 210 as the print tile 300 is advanced into engagement with the print supply system 406. As noted above, other types of alignment features can be used. The second guide 410 and the engagement of the alignment features 414 and the alignment features 216, together with the flexible mounting of the first section 310 to the second section 322, guide the print tile 300 toward the fluid and electrical connections of the print supply system 406 with passively narrowing tolerances to bring the engagement feature 218 (FIG. 2B) into contact with an engagement screw 416 disposed through the supply plate 404, and to bring the fluid ports 212 and 214 (FIG. 2B) of the fluid manifold 210 and the connection edge 328 of the interface circuit 308 into near-connection with the counterpart features of the print supply system 406. The engagement screw 416 is captive within the supply plate 406 such that operating the engagement screw 416 urges the print tile 300 into secure fluid and electrical contact with the print supply system 406. The various alignment features of the fluid manifold 210, and the precise positioning of the interface circuit 308 on the print tile 300, along with the first and second guides 408 and 410 make insertion of the print tile 300 into the printhead assembly 400, and connection of the print tile 300 with the print supply system 406, quick and easy. The shape, sizing, and tolerances of the second guide 410, the alignment features 414, the alignment features 216, and the flexible connection of the first section 310 and the second section 322 of the tile structure 304 allow secure alignment of the print tile 300 upon insertion into the printhead assembly 400.

When connection with the print supply system 406 is made, fluid nozzles (not shown) of the print supply system 406 fluidly connect and seal with the fluid ports 212 and 214 of the fluid manifold 210, providing fluid connection with fluid supply and return conduits 420 of the print supply system 406 that are located opposite the supply plate 404 from the fluid manifold 210. Fluid valves 422 control fluid flow from the print supply system 406 into the fluid manifold 210 and the print tile 300, and vice versa. As noted above, the printhead assembly 400 comprises a plurality of the print tiles 300, each connected to the print supply system 406 in the same way. The fluid valves 422, a pair for each print tile 300, are operated by a control system to control fluid flow between each print tile 300 a fluid reservoir for the printhead assembly 400. More than one type of print fluid can be used with such a printhead assembly, where each fluid type is delivered to a distinct subset of the print tiles 300 using dedicated fluid supply and return conduits.

While the foregoing is directed to embodiments of one or more inventions, other embodiments of such inventions not specifically described in the present disclosure may be devised without departing from the basic scope thereof, which is determined by the claims that follow.

The invention claimed is:

1. A printhead assembly for an inkjet printer, the printhead assembly comprising:

a printhead comprising a plurality of nozzles;

a nozzle plate attached to the printhead;

a base plate attached to the nozzle plate by at least three fasteners that provide independent positioning of the nozzle plate with respect to the base plate in three independent dimensions; and a tile structure attached to the base plate at a first end of the tile structure and a fluid manifold attached to a second end of the tile structure opposite from the first end, the fluid manifold comprising at least two fluid connections and at least two manifold alignment features, and further comprising an electrical component attached to the tile structure, the electrical component having a connection member positioned in a notch of the fluid manifold.

2. The printhead assembly of claim 1, wherein a thermal expansion coefficient of the base plate is less than about $20\times10^{-6}$/K.

3. The printhead assembly of claim 1, wherein the tile structure has a first member attached to the base plate and a second member attached to the fluid manifold, and wherein the first member is attached to the second member by a flexible connection.

4. The printhead assembly of claim 1, wherein at least one of the fasteners includes a shim or a conical screw.

5. The printhead assembly of claim 1, wherein the fluid manifold has a wall that surrounds the fluid connections, a recess to receive a manifold fastener, or both.

6. The printhead assembly of claim 1, further comprising a guide to maintain orientation of the tile structure into the printhead assembly.

7. A printhead assembly for an inkjet printer, the printhead assembly comprising:

a printhead comprising a plurality of nozzles;

a nozzle plate attached to the printhead;

a base plate attached to the nozzle plate by at least three fasteners that provide independent positioning of the nozzle plate with respect to the base plate in three independent dimensions; and a tile structure attached to the base plate at a first end of the tile structure and a fluid manifold attached to a second end of the tile structure opposite from the first end, the fluid manifold comprising at least two fluid connections and at least two manifold alignment features, wherein the fluid manifold has a recess to receive a manifold fastener, and wherein the fluid manifold further comprises a sensor to sense presence of the manifold fastener.

8. The printhead assembly of claim 7, wherein the sensor is attached to a major surface of the fluid manifold.

9. The printhead assembly of claim 7, wherein a thermal expansion coefficient of the base plate is less than about $20\times10^{-6}$/K.

10. The printhead assembly of claim 7, wherein the tile structure has a first member attached to the base plate and a second member attached to the fluid manifold, and wherein the first member is attached to the second member by a flexible connection.

11. The printhead assembly of claim 7, wherein at least one of the fasteners includes a shim or a conical screw.

12. The printhead assembly of claim 7, wherein the fluid manifold has a wall that surrounds the fluid connections.

13. A printhead assembly for an inkjet printer, the printhead assembly comprising:

a support plate;

a supply plate comprising a plurality of alignment features;

a plurality of print tiles disposed between the support plate and the supply plate, each print tile comprising:

a plurality of printheads, each printhead comprising a plurality of nozzles;

a nozzle plate attached to each printhead;

a base plate attached to the nozzle plate by at least three fasteners that provide independent positioning of the nozzle plate with respect to the base plate in three independent dimensions; and a fluid manifold comprising at least one alignment feature that matches one of the alignment features of the supply plate.

14. The printhead assembly of claim 13, wherein the supply plate further comprises a print tile guide.

15. The printhead assembly of claim 13, wherein the support plate further comprises a print tile guide.

16. The printhead assembly of claim 13, wherein the support plate further comprises a print tile guide, the supply plate further comprises a print tile guide, and the print tile comprises a tile structure comprising a first section flexibly coupled to a second section, the second section coupled to the base plate.

17. The printhead assembly of claim 13, wherein a thermal expansion coefficient of the base plate is less than about $20\times10^{-6}$/K.

18. The printhead assembly of claim 13, wherein each print tile has a first member attached to the base plate and a second member attached to the fluid manifold, and wherein the first member is attached to the second member by a flexible connection.

19. The printhead assembly of claim 13, wherein at least one of the fasteners includes a shim or a conical screw.

20. The printhead assembly of claim 13, wherein the fluid manifold has a wall that surrounds a plurality of fluid connections, a recess to receive a manifold fastener, a sensor to sense presence of a manifold fastener, or any combination thereof.

* * * * *